United States Patent [19]

Esmailzadeh

[11] Patent Number: 5,709,511

[45] Date of Patent: Jan. 20, 1998

[54] CURVED MACHINING JIG

[76] Inventor: Karim Esmailzadeh, 3905 Viola Rd., NE., Rochester, Minn. 55906

[21] Appl. No.: 558,810

[22] Filed: Nov. 15, 1995

[51] Int. Cl.$^6$ ..................................................... B23C 3/16
[52] U.S. Cl. ........................... 409/199; 408/65; 408/89; 408/127; 408/236; 409/163; 409/219; 409/228
[58] Field of Search ..................... 82/113; 408/62, 408/65, 89, 127, 236; 409/145, 163, 199, 219, 228

[56] References Cited

U.S. PATENT DOCUMENTS

| | | | |
|---|---|---|---|
| 195,181 | 9/1877 | Strohm | 408/127 |
| 488,277 | 12/1892 | Hamilton | 418/35 |
| 550,783 | 12/1895 | Elliott et al. | 408/127 |
| 813,974 | 2/1906 | King | 418/33 |
| 830,124 | 9/1906 | Weeks | 418/35 |
| 1,058,537 | 4/1913 | Bonner | 409/163 |
| 2,960,892 | 11/1960 | Spravka | 408/127 |
| 3,617,143 | 11/1971 | McKee | 408/127 |
| 3,709,624 | 1/1973 | Blank | 408/127 |
| 4,231,690 | 11/1980 | Burns | 82/113 |
| 4,246,812 | 1/1981 | Gladwin et al. | 82/1 C |
| 4,436,461 | 3/1984 | DiMartino | 409/199 |
| 5,017,057 | 5/1991 | Kryger | 408/68 |
| 5,056,964 | 10/1991 | Naka et al. | 408/127 |

FOREIGN PATENT DOCUMENTS 1227082  6/1959  France.

OTHER PUBLICATIONS

Tschudi Rotary Engine description.

*Primary Examiner*—Daniel W. Howell
*Assistant Examiner*—Christopher Kirkman
*Attorney, Agent, or Firm*—Palmatier, Sjoquist, Helget & Voigt, P.A.

[57] ABSTRACT

A curved machining jig for machining a curved workpiece having an arcuate shaped centerline, the curved machining jig comprising a table having a rotatably mounted column extending perpendicular from the table, the column rotating on a first axis perpendicular to the table, an arm attached to and extending from the column, a drive portion on the arm, a tool attachment and a workpiece attachment supported above the table, the curved workpiece removably retained by the workpiece attachment, a machining tool on the tool attachment, a means for moving the drive arm causing the arm to rotate about the column engaging the workpiece and the machining tool to perform a curved machining operation on the workpiece.

38 Claims, 5 Drawing Sheets

CURVED MACHINING JIG

BACKGROUND OF THE INVENTION

The present invention relates to tools for machining arcuate workpieces, and more particularly to a tool for machining the external surface of a curved shaft or drilling a curved hole in a segment of a torodial shaped workpiece.

Machine tools are well known for shaping and drilling complex surfaces in a workpiece. However, applications such as machining a curved shaft have met with difficultly in prior an machine tools. Prior-art machine tools have been able to meet the requirements for machining a curved shaft over only a short angular distance along a curved workpiece. For applications requiring an angularly longer curved shaft prior an devices must create multiple short segments and attach the segments. Furthermore, drilling a curved hole in a workpiece extending through the workpiece has been difficult with prior an machine tools. The prior an devices are limited to forming a curved hole of a small arcuate length.

These prior an devices do not sufficiently meet the need for precision machining an external surface of a curved shaft or drilling a curved hole in a workpiece. Precise tolerance must be maintained and finishing surfaces are extremely important for workpieces that are arcuate shaped and have a high speed or high temperature application. The pistons, shafts and cylinders of devices such as the Orbiting Piston Combustion Engine disclosed and claimed in U.S. patent application Ser. No. 08/369,740 now abandoned of the same inventor require precisely machined surfaces.

There is a need for a new tool that will overcome the problems of the prior art, be extremely simple in design and achieve the benefits of a machine tool for finishing the external surface or drilling a curved hole in a workpiece having a shape of a segment of a toroid.

SUMMARY OF THE INVENTION

A curved machining jig for machining a curved workpiece having an arcuate shaped centerline, the curved machining jig comprising a table having a rotatably mounted column extending perpendicular from the table, the column rotating on a first axis perpendicular to the table, an arm attached to and extending from the column, a drive portion on the arm, a tool attachment and a workpiece attachment on the curved machining jig, the curved workpiece removably retained by the workpiece attachment, a machining tool on the tool attachment, a means moving the drive arm causing the arm to rotate about the column engaging the workpiece and the machining tool to perform a curved machining operation on the workpiece.

A principal object and advantage of the present invention is its ability to machine an arcuate shaped to radial portion workpiece extending over an angular length. A further object and advantage of the present invention is the ability to machine a workpiece having a large or small cross-sectional size.

Another object and advantage of the present invention is that the arm drive portion may be extended to increase the stability of controlling the movement of the invention around the column.

Another object and advantage of the present invention is that a standard machine tool table and column maybe used.

Another object and advantage of the invention is a curved hole may be formed in a workpiece by using a curved hole drill in the tool attachment.

Another object and advantage of the invention is a curved shaft or piston may be machined by using a surface finishing tool in the tool attachment.

A feature of the invention is the tool attachment maybe mounted on the table or the arm.

Another feature of the invention is the workpiece attachment maybe mounted on the table or the arm.

Another feature of the invention is the tool maybe moved with respect to the workpiece.

Another feature of the invention is the workpiece maybe moved with respect to the tool.

DETAILED SPECIFICATION

Figure 1:
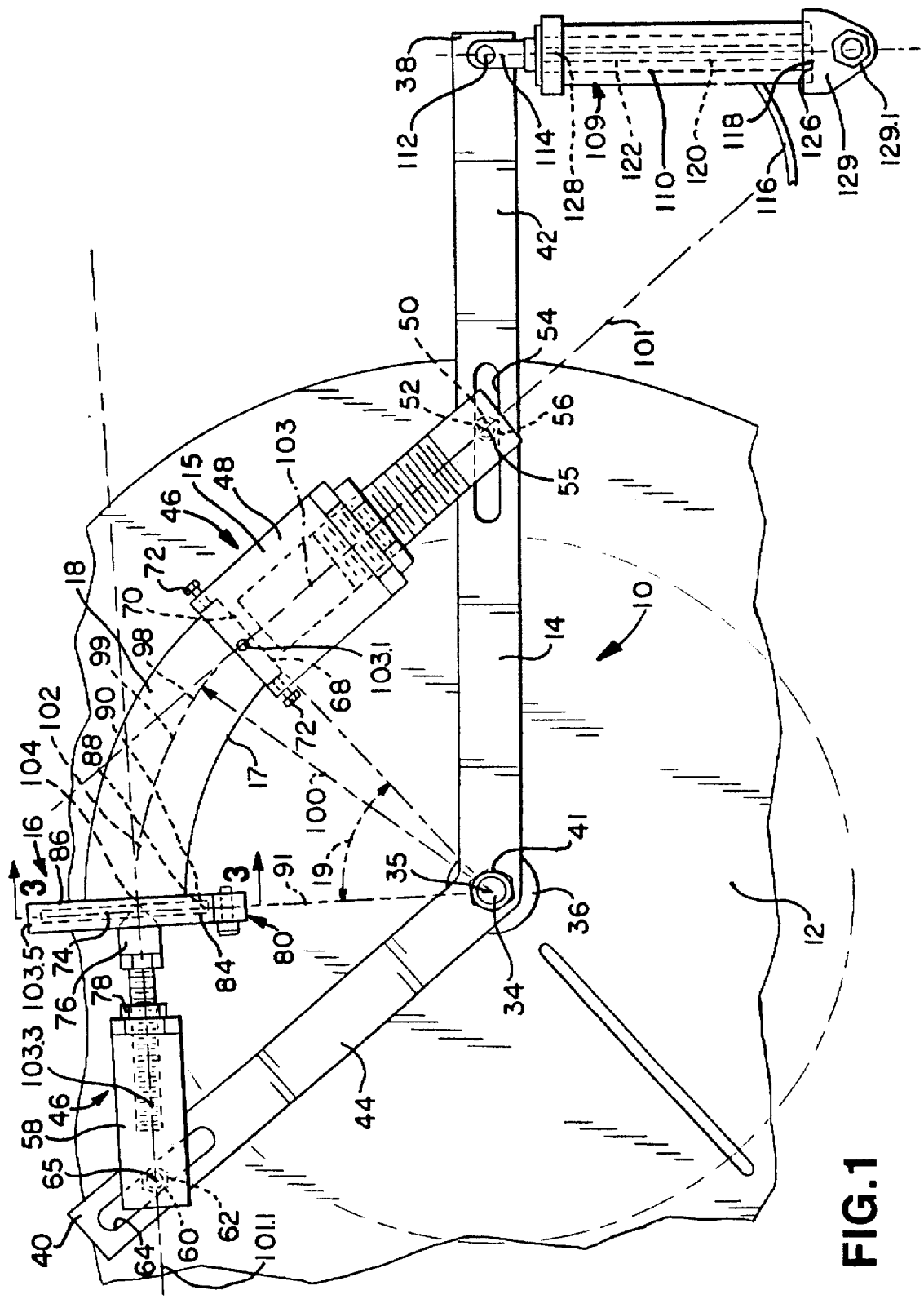
FIG. 1 is a plan view of the invention configured to machine the outside surface of a curved shaft.

The curved machining jig illustrated in FIG. 1 is indicated in general by the numeral 10. Curved machining jig 10 comprises a table 12, arm 14, tangential interface member 15 and a machining tool 16. The curved machining jig 10 is used to machine the outside surface 17 of a curved workpiece 18 used as a curved shaft for such applications as an ORBITAL ENGINE disclosed and claimed in U.S. patent application Ser. No. 08/369,740 herein incorporated in its entirety by reference. The workpiece has angular measurement 19. The curved machining jig 10 is alternatively used to machine a curved hole 20 in a curved workpiece 18. It should be understood, a curved workpiece 18 may have both the curved surface 17 and the curved hole 20.

Figure 2:
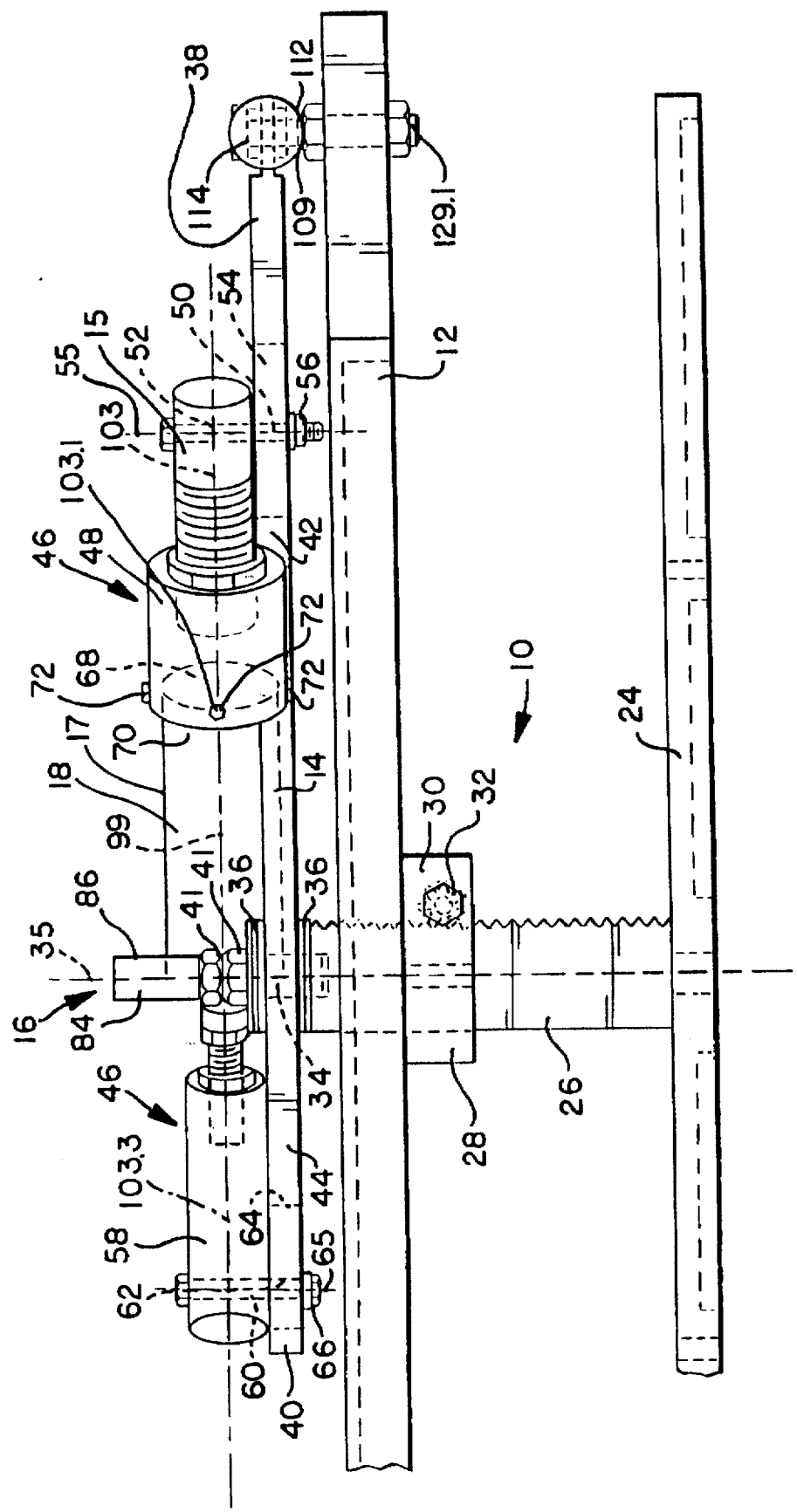
FIG. 2 is an elevational view of FIG. 1.

Referring to FIGS. 1 and 2, the curved machining jig 10 is shown configured to machine the outside surface of curved workpiece 18. The curved machining jig 10 comprises a base 24 with a table support 26 on the base 24. Table elevation locking device 28 attaches to table support 26 with C-clamp 30 held at a predetermined elevation by bolt 32. It should be understood that bolt 32 extends through both ends of C-clamp 30 to grip table support 26. Table support 26 extends through table 12 to support table 12 by C-clamp 30. Table support 26 extends above table 12 to support column 34 having column centerline 35. Column bearing 36 is mounted on column 34 to provide a rotatable mount for column 34 on table support 26.

Arm 14 is securely mounted on column 34 at column bearing 36 with double column nut 41. Arm drive portion 42 is intermediate column 34 and arm first end 38. Arm extension 44 extends from column 34. It should be understood, curved workpiece 18 is mounted between arm first end 38 and arm second end 40 by workpiece attachment 46 used to support and hold curved workpiece 18.

In the embodiment illustrated in FIGS. 1 and 2, tangential interface member 15 comprises workpiece attachment 46 supporting the curved workpiece 18 above the table having a first curved workpiece holder 48 attached to arm drive portion 42 by bolt 50 extending through first holder hole 52 and drive arm slot 54 at intersection point 55 and held in place by nut 56. Workpiece attachment further comprises second curved workpiece holder 58 attached to arm extension 44 by bolt 60 extending through second holder hole 62 and extension slot 64 at point 65. Bolt 60 is held in place by nut 66. Slots 54, 64 are used to machine a curved shaft having a range of radiuses as will be understood.

Curved workpiece first end 68 bears against first holder recessed workpiece engagement surface 70 and is held in place by centering screws 72. Curved workpiece second end 74 bears against second workpiece holder screw jack 76 and is held in place by tension from holding nut 78.

Figure 3:
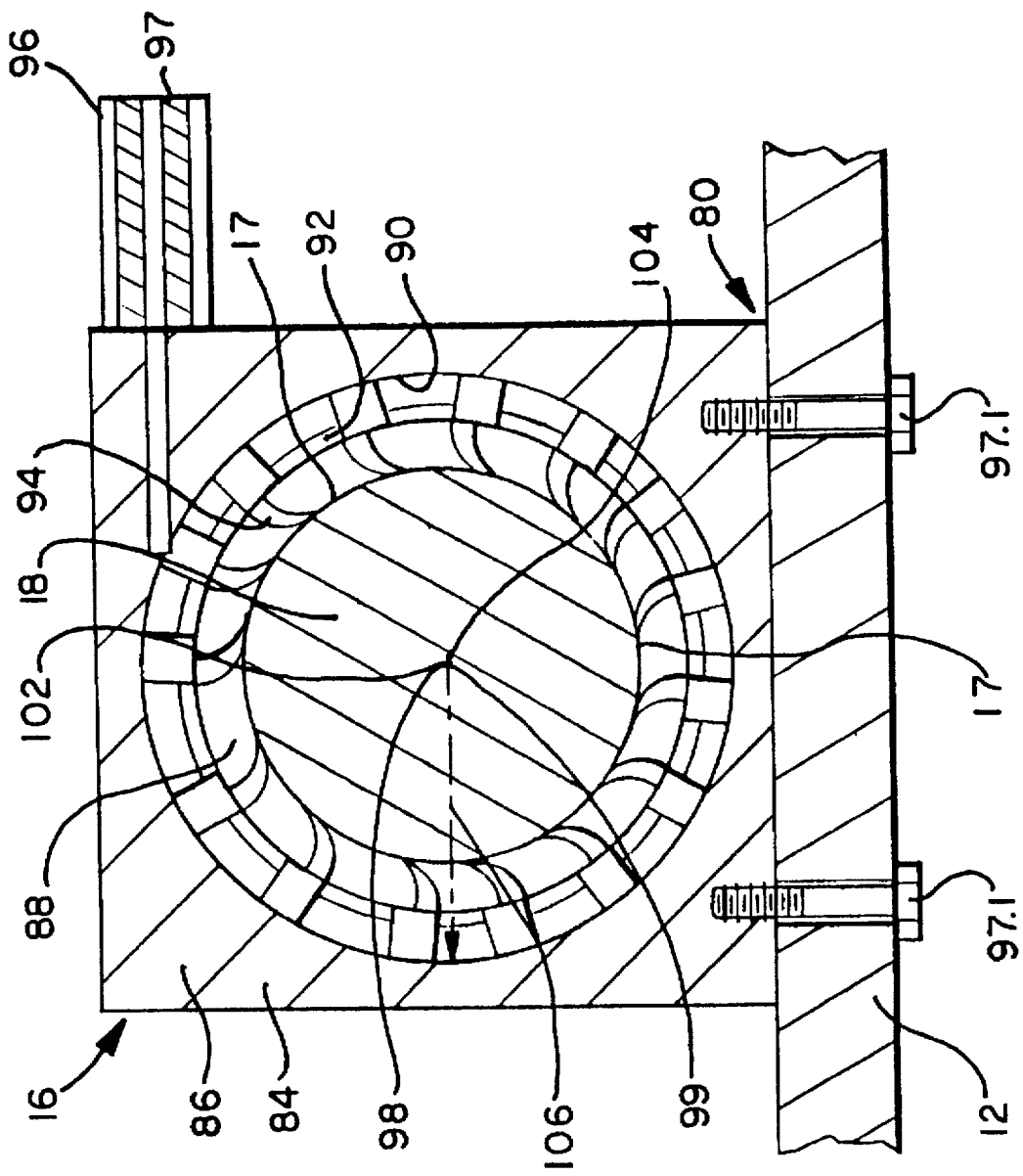
FIG. 3 is a section view taken at approximately 3—3 of FIG. 1.

Tool attachment 80 supports machining tool 16 above the table and intermediate arm drive portion 42 and arm extension 44. In the embodiment shown in FIGS. 1 and 2, machining tool 16 comprises a surface finishing tool 84 having a surface finishing frame 86 and an opening 88. As seen in FIG. 3, surface finishing frame 86 has a circular bearing race 90 on the frame 86. A surface cutter 92 having a plurality of blades 94 is driven concentrically around opening 88 on the bearing race 90 by means for rotating 96 shown as variable speed motor 97 mounted on the surface finishing frame 86 and bearing against surface cutter. The means for rotating 96 drives the blades 94 in a circular path around bearing race 90 to machine a smooth cylindrical finish on outside surface 17 as it is passed through the opening 88. Tool attachment 80 comprises tool bolts 97.1 extending through table 12 and threadably connected to finishing frame 86. It should be understood surface finishing tool 84 may alternatively comprise other surface finishing elements such as belts or grinding wheels as are well known in the art of surface finishing.

It should be understood the positioning and movement of curved workpiece 18 with respect to machining tool 16 is a critical advantage of this novel invention. Workpiece centerline 99 is an arcuate shaped line defining the center of the surface finishing to be performed on workpiece 18. A guide circle 98 is calculated around column centerline 35 having a guide radius 100. The guide circumference 102 of guide circle 98 is aligned with arcuate workpiece centerline 99 and forms an alignment reference for movement about 34.

In the embodiment shown in FIGS. 1 and 2, opening 88 has a surface finishing center point 104 and an opening radius 106. The opening radius 106 is aligned on guide circle radius 100 is perpendicular to a tangent 101 of guide circumference 102 at surface finishing center point 104. Curved workpiece 18 has an arcuate shaped centerline 99 at guide radius 100 aligned with guide circumference 102. Arcuate shaped centerline 99 is aligned with guide circumference by adjusting bolts 50, 60 in slots 54, 64 respectively. First curved workpiece holder 48 has a centerline 103 aligned with a first tangent 101 of guide circumference 102 at the intersection point 103.1 of workpiece centerline 99 and curved workpiece first end 68. Second curved workpiece holder 58 has centerline 103.3 aligned with a second tangent 101.1 of guide circumference 102 at the intersection 103.5 of workpiece centerline 99 and curved workpiece second end 74 in the preferred embodiment. The assembly of the first and second holders 48, 58 and the curved workpiece 18 extend through the finishing tool opening 88.

A means for moving 14 illustrated in general by the numeral 109 is attached to table 12 and bears against arm drive portion 42 to rotate arm 14 around column 34 and bears against curved workpiece 18 with tangential interface member 15. The embodiment shown in FIGS. 1 and 2 illustrates automatic hydraulic feed cylinder 110 attached to arm first end 38 with feed bolt 112 through cylinder flange 114. Automatic feed cylinder 110 is connected to hydraulic power source (not shown) by automatic feed tube 116 moving automatic feed piston 118, slidably mounted in feed cylinder 120. Tie rod 122 connects automatic feed piston 118 to arm drive potion 42 at feed bolt 112. It should be understood, automatic feed piston 118 travels back and forth in feed cylinder 120 from the retract stop 126 to extend stop 128 causing the motion to be transferred to arm drive portion 42 by tie rod 122 rotating arm 14 about column 34. The speed of travel of tie red 122 is controllable to optimize the quality of finish on surface 17. Automatic feed cylinder 112 is also connected to table 12 at flange 129 with bolt 129.1. Means for moving 109 may alternatively be any mechanism well known in the art of linear or arcuate mechanical movement such as hydraulic or pneumatic cylinders, linear or rotary motors.

In operation, arm 14 is bolted to column 34 and tool attachment 80 is attached to table 12 intermediate arm first end 38 and arm second end 40. A guide circle is calculated about column centerline 35 having a guide radius 100 and guide circumference 102. The length of curved workpiece 18 is defined by workpiece angular measurement 19 and guide radius 100. A first tangent 101 to guide circumference 102 is calculated to intersect with arm drive portion 42 at intersection point 55. Tangential interface 15 comprising first curved workpiece holder 48 is attached along first tangent 101 intermediate intersection point 55 and curved workpiece 18. A second tangent 101.1 to guide circumference 102 is calculated to intersect with arm extension 44 at point 65. Second curved workpiece holder 58 is attached along second tangent 101.1 intermediate point 65 and curved workpiece 18.

Surface finishing tool 84 is mounted on tool attachment 80 with surface finishing centerpoint 104 on guide circumference 102. Second curved workpiece holder 58 is inserted through opening 88 to extend between curved workpiece 18 and arm extension 44. Curved workpiece 18 is locked between holders 48, 58 to align workpiece centerline 99 with guide circumference 102. Power is applied to means for rotating 96 causing surface cutter blades 94 to rotate circumferentially inside opening 88.

Power is applied to moving means 109 causing arm 14 to bear against tangential interface member 15 which bears against and moves curved workpiece 18 coaxially through opening 88. Blades 94 cut a desired finish on the surface 17. When surface finishing frame 86 contacts first curved workpiece holder 48, power is interrupted to moving means 109 and means for rotating 96. Curved workpiece 18 is then removed from assembly 10.

Figure 4:
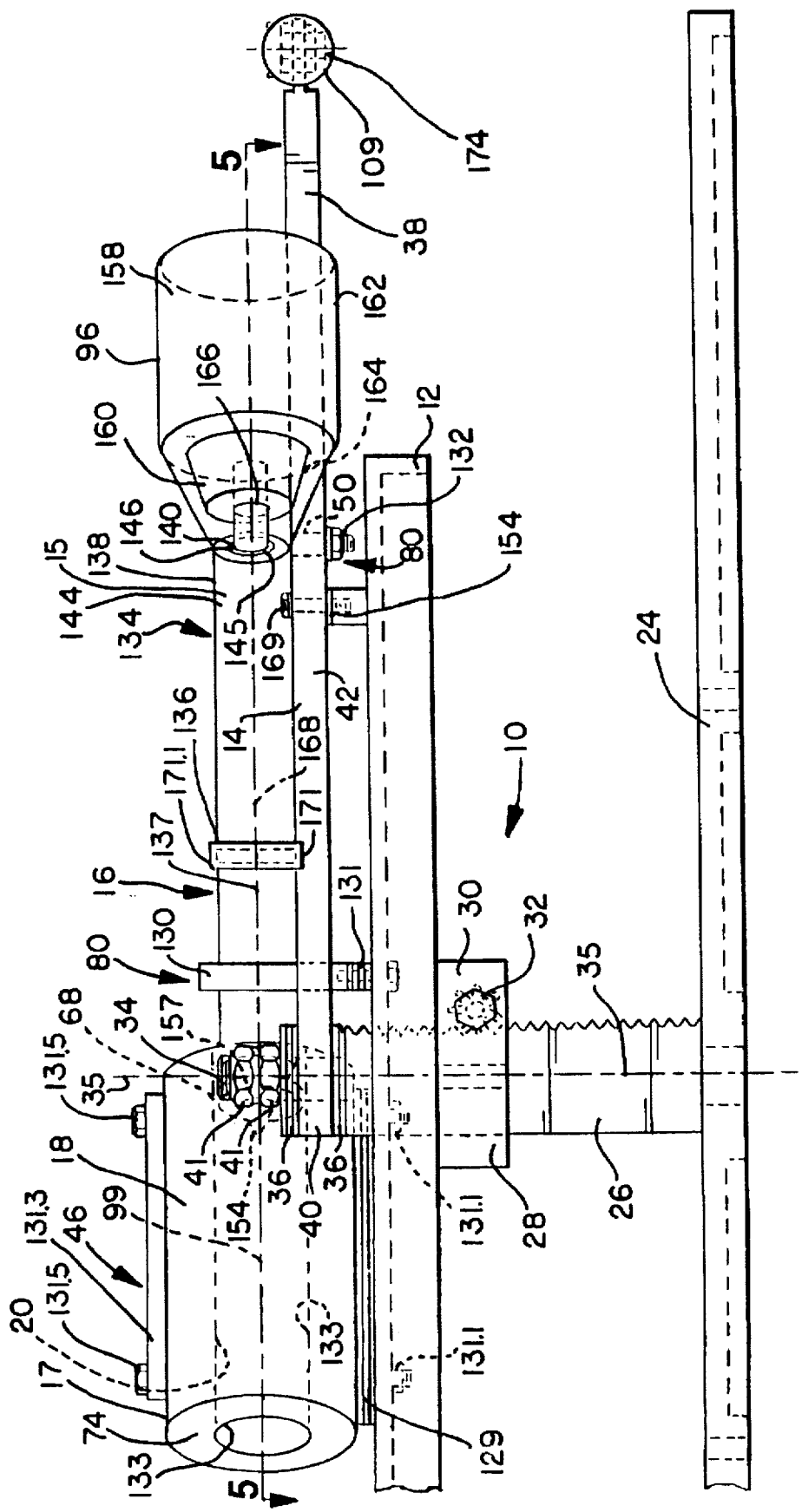
FIG. 4 is a plan view of the invention configured for machining a curved hole.
Figure 5:
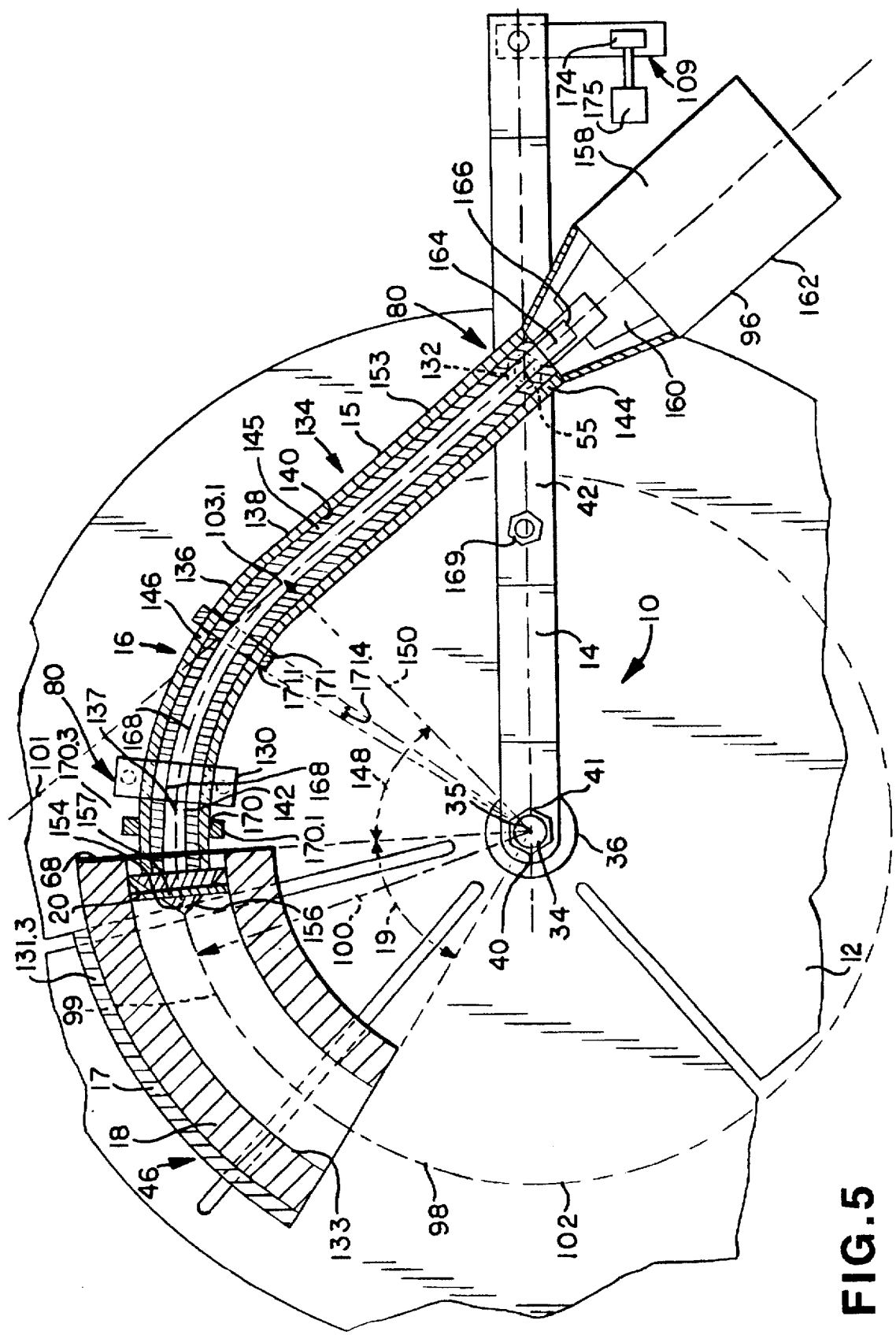
FIG. 5 is a section view taken at approximately 5—5 of FIG. 4 illustrating the machining tool extending into the curved hole.

In an alternate embodiment shown in FIGS. 4 and 5, curved machining jig 10 is configured for drilling a curved hole 20 in curved workpiece 18 along workpiece centerline 99. In this embodiment, tool attachment 80 comprises a drill attachment 132 on arm drive portion 42. Sleeve guide 130 is attached to table 12 and slidingly bears against machining tool 16 to guide and support. Workpiece attachment 46 is on table 12 adjacent column 34 and arm drive portion 42. In the embodiment of FIGS. 4 and 5, workpiece attachment 46 comprises workpiece bolts 131.5 and workpiece nuts 131.1 extending through holding plate 131.3. Curved workpiece 18 having a rough hole 133 cast therein, is retained in workpiece attachment 46 aligning workpiece centerline 99 to guide circumference 102 using workpiece shims 129 or other means known in the art of precisely mounting an object. Tool guide 130 is positioned adjacent curved workpiece first end 68 to support and guide machining tool 16. Tool guide shims 131 are used to precisely adjust the height of tool guide 130 above table 12

In the embodiment shown in FIGS. 4 and 5, machining tool 16 comprises a curved hole drill 134 having a tool centerline 137 at the guide circle circumference 102. The curved hole drill 134 comprising a sleeve 136 having an outer surface 138, a tubular passage 140, a curved end 142 and tangential interface member 15, curved hole drill 134 is connected to tool attachment 80 comprising drill bolt 132, at intersection point 55. Tubular passage 140 has flexible drive shaft casing 145 coaxially mounted therein.

Sleeve arcuate portion 146 is adjacent the curved end 142 and intermediate the means for rotating 96 and curved end 142. Sleeve arcuate portion 146 has an arcuate length defined by angle 148 at radius 150. In the preferred embodiment, sleeve angle 148 is equal to or greater than workpiece angular measurement 19. Radius 150 and guide radius 100 are equal to form a curved hole 20. A curved hole drill bit 154 is mounted on the sleeve curved end 142 having a bit centerpoint 156 on the tool centerline 137. Hole machining cutter 157 is attached to curved hole drill bit 154 adjacent sleeve curved end 142 to enter and machine rough hole 133 into curved hole 20. It should be understood the curved hole 20 formed by curved hole drill bit 154 and hole machining cutter 157 has a diameter larger than the diameter of sleeve outer surface 138.

A means for rotating 96 is mounted on the tangential interface member 15. In the preferred embodiment, means for rotating 96 comprises a variable speed electric motor 158 having a chuck 160 and a casing 162 and flexible sleeve drive shaft 164. Casing 162 is attached to sleeve 136. Flexible sleeve drive shaft 164 is rotatably mounted in the sleeve tubular passage 140 having a first end 166 on the means for rotating 96 and a transfer end 168 on the curved hole drill bit 154 and hole machining cutter 157. Drive arm guide 169 is attached to arm drive portion 42 intermediate tool attachment 80 and column 34 to support the weight of means for rotating 96 and hold tool centerline 137 on guide circumference 102. Drive arm guide shims 154 are used to precisely position drive arm guide 169 between table 12 and drive arm 42.

Sleeve arcuate portion 146 is slidably inserted in table sleeve guide 130 that bears against and supports sleeve outer surface 138 to hold the tool centerline 137 on workpiece centerline 99. Sleeve guide 130 may also comprise curved hole sleeve guide 170 inserted in curved hole 20 to support and guide sleeve arcuate portion 146 as it forms curved hole 20. Curved hole sleeve guide 170 bears against sleeve outer surface 138 at hole guide inner surface 170.1 and against curved hole 20 at hole guide outer surface 170.3.

Tangential interface member 15 comprises sleeve straight portion 153 shown in FIG. 5 adjacent the means for rotating 96 and intermediate drill bit 154 and arm 14. Sleeve straight portion is a linear extension from sleeve arcuate portion 146, along a first tangent 101 of guide circumference 102. Sleeve straight portion 153 bears against sleeve arcuate portion 146 at the point of intersection 103.1 of the first tangent 101 and the guide radius 100 thus pushing sleeve arcuate portion 146 along first tangent 101.

Sleeve arcuate portion 146 may comprise arcuate removable sleeve segment 171 having an arcuate length 171.4. Removable sleeve segments 171 may be added to sleeve arcuate portion 146 to extend the curved hole length 19. Means for moving 109 is retracted to add removable sleeve segment 171 to sleeve arcuate portion 146. Removable sleeve segment 171 is held in place by segment band 171.1 or other means known in the art of splicing rods and tubes.

In the embodiment illustrated in FIGS. 4 and 5 means for moving 109 comprises a gear feed assembly 174 such as a rack and pinion arrangement driven by motor 175. Means for moving may alternatively be any mechanism well known in the art of linear or arcuate mechanical movement such as hydraulic or pneumatic cylinders, linear or rotary motors.

It should be understood the positioning and movement of sleeve 136 and curved hole drill bit 154 with respect to curved workpiece 18 is a critical advantage of this novel invention. Workpiece centerline 99 is an arcuate shaped line defining the center of the hole formed by curved hole drill 134 in workpiece 18. Guide circumference 102 must always align with tool centerline 137 and workpiece centerline 99 as moving means 109 rotates arm 14 about column 34. Shims 129, 131 and 154 are used to align these critical In operation, a guide circle 98 is calculated about column centerline 35 having a guide radius 100. Arm 14 is attached to column 34. A first tangent 101 to workpiece centerline 99 is calculated to intersect with arm drive potion 42 at intersection point 55. Tool attachment 80 is attached to arm 14 at intersection point 55. Curved hole drill 134 is attached to tool attachment 80 and slidably inserted into sleeve guide 130 having tangential interface member 15 aligned with first tangent 101 and intermediate sleeve arcuate portion 146 and arm 14. Sleeve 136 is aligned by shims 129, 131 and 154 to have tool centerline 137 on guide circumference 102.

Curved workpiece 18 is mounted in workpiece attachment 46 on table 12 having first end 68 adjacent curved tool drill bit 154. The length of curved workpiece 18 is defined by workpiece angular measurement 19 and guide radius 100 and is equal to or less than the length of arcuate sleeve portion 146. Sleeve straight potion 153 is the length of first tangent 101 from guide circumference 102 at point 103.1 to arm 14.

Power is applied to electric motor 158 to rotate flexible drive shaft 164 transferring the rotation to curved hole drill bit 154.

Power is applied to moving means 109 causing arm 14 to push curved hole drill 134 along first tangent 101 causing drill bit 154 to travel through rough hole 133 to form curved hole 20. Workpiece hole guide 170 is added around sleeve 135 in curved hole 20 intermediate workpiece first end 68 and drill bit 154 to continuously support tool centerline 137 on guide circumference 102. When sleeve straight portion 153 meets workpiece first end 68, means for moving 109 is reversed withdrawing curved hole drill 134 from curved hole 20. Removable sleeve segment 171 may be added to sleeve arcuate portion 146 to extend the length 19 of curved hole 20. Curved workpiece 18 is then removed from assembly 10.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

I claim:

1. A curved machining jig for machining a curved workpiece along an arcuate shaped centerline, the curved machining jig comprising:
   (a) a table having a rotatably mounted column extending perpendicular from the table, the column rotating on a first axis perpendicular to the table, the curved workpiece supported above the table;
   (b) an arm attached to and extending from the column;
   (c) a machining tool supported above the table; and
   (d) a means for moving on the table, the means for moving bearing against the arm, a tangential interface member on the arm and connected to an element selected from the group of consisting of the machining tool and the curved workpiece whereby the arm rotates around the column moving the curved workpiece and the machining tool in relation to each other permitting machining of the workpiece.

2. The invention of claim 1 further comprising the tangential interface member mounted at an intersection point of the arm and a tangent to a guide circle whereby the tangential interface member pushes along the tangent to move the curved workpiece and the machining tool in relation to each other permitting machining of the workpiece.

3. The invention of claim 1 wherein the curved workpiece is supported by the arm whereby the curved workpiece moves in relation to the machining tool.

4. The invention of claim 3 wherein the tangential interface member further comprises a first curved workpiece holder on the arm having a workpiece engagement surface.

5. The invention of claim 4 wherein the arm comprises an arm extension, a second curved workpiece holder on the arm extension having a screw jack.

6. The invention of claim 4 wherein the machining tool further comprises a surface finishing tool whereby the curved workpiece is machined on an outside surface.

7. The invention of claim 6 wherein the surface finishing tool further comprises an opening, a surface cutter on the surface finishing tool, a means for rotating connected to the surface cutter, a workpiece assembly comprising the first and second workpiece holders and the curved workpiece extending through the opening whereby the means for rotating moves the surface cutter concentric to the opening and the means for moving moves the curved workpiece coaxially through the opening.

8. The invention of claim 7 wherein the surface cutter further comprises a plurality of blades on the surface cutter.

9. The invention of claim 4 wherein the first curved workpiece holder further comprises a centering screw.

10. The invention of claim 1 wherein the means for moving further comprises a hydraulic cylinder.

11. The invention of claim 1 wherein the means for moving further comprises a gear feed assembly.

12. The invention of claim 1 wherein the machining tool is on the arm whereby the tool moves in relation to the curved workpiece.

13. The invention of claim 12 wherein the machining tool further comprises a curved hole drill having a drill bit and a means for rotating, a sleeve intermediate the means for rotating and the drill bit.

14. The invention of claim 13 further comprising a tool guide on the table, the tool guide bearing against the sleeve whereby the curved hole drill is supported by the tool guide.

15. The invention of claim 13 wherein the tangential interface member further comprises a sleeve straight portion adjacent the means for rotating.

16. The invention of claim 13 wherein the sleeve further comprises a sleeve arcuate portion intermediate means for rotating and the drill bit.

17. The invention of claim 13 wherein the curved hole drill further comprises a flexible drive shaft in a sleeve tubular passage in the sleeve, the flexible drive shaft intermediate the means for rotating and the drill bit.

18. A curved machining jig in combination with a curved workpiece having an arcuate shaped workpiece centerline, the curved machining jig comprising:

(a) a table having a rotatably mounted column extending perpendicular from the table, the column rotating on a first axis perpendicular to the table, the curved workpiece on the table;

(b) an arm attached to and extending from the column, a drive portion on the arm, a means for moving on the table and bearing against the drive portion whereby the arm is rotated about the column;

(c) a curved hole drill on the arm having means for rotating, a drill bit on the means for rotating, a tangential interface member intermediate the drill bit and the arm whereby the arm bears against the tangential interface member to move the drill bit along the arcuate shaped centerline to form a curved hole in the workpiece.

19. The invention of claim 18 wherein the curved hole drill further comprises a sleeve having an outer surface and an arcuate portion adjacent the drill bit, the arcuate portion having an angular length.

20. The invention of claim 19 further comprising a table sleeve guide on the table slidably bearing against the sleeve outer surface.

21. The invention of claim 19 further comprising a curved hole sleeve guide on the sleeve arcuate portion whereby the curved hole sleeve guide bears against the sleeve outer surface and the curved hole to support and guide the drill bit.

22. The invention of claim 18 wherein the means for moving further comprises a gear assembly.

23. The invention of claim 18 wherein the means for rotating further comprises a variable speed motor.

24. The invention of claim 19 wherein the sleeve arcuate portion further comprises a removable sleeve segment having a second angular length whereby the sleeve arcuate portion angular length is increased or decreased by adding or removing the removable sleeve segment.

25. The invention of claim 18 wherein the curved hole drill further comprises a flexible sleeve drive shaft in a sleeve tubular passage, a first end attached to the means for rotating and a transfer end attached to the drill bit.

26. The invention of claim 18 wherein the tangential interface member is mounted at the intersection point of a tangent to a guide circle and the arm whereby the tangential interface member bears against the drill bit along a tangent to the guide circle.

27. The invention of claim 18 wherein the curved hole drill further comprises a hole machining cutter on the means for rotating.

28. A curved machining jig in combination with a curved workpiece having an arcuate shaped workpiece centerline, the curved machining jig comprising:

(a) a table having a rotatably mounted column extending perpendicular from the table, the column rotating on a first axis perpendicular to the table, a machining tool supported above the table;

(b) an arm attached to and extending from the column, a drive portion on the arm, a means for moving on the table and bearing against the drive portion whereby the arm is rotated around the column; and (c) a tangential interface member on the arm supporting the curved workpiece above the table whereby the arm moves the curved workpiece in relation to the machining tool to permit machining of the curved workpiece.

29. The invention of claim 28 wherein the tangential interface member further comprises a first curved workpiece holder intermediate the arm and the curved workpiece, the first curved workpiece holder mounted along a first tangent of a guide circle.

30. The invention of claim 29 wherein the first curved workpiece holder further comprises a workpiece engagement surface bearing against the workpiece.

31. The invention of claim 29 wherein the first curved workpiece holder further comprises a centering screw bearing against the curved workpiece.

32. The invention of claim 28 wherein the arm further comprises an arm extension extending from the column.

33. The invention of claim 32 wherein the arm further comprises a second curved workpiece holder on the arm extension mounted along a second tangent of the guide circle, a screw jack on the second curved workpiece holder bearing against the curved workpiece.

34. The invention of claim 28 wherein the machining tool further comprises a surface finishing tool having a surface cutter, a means for rotating connected to the surface cutter whereby the means for rotating moves the surface cutter to finish an outside surface of the curved workpiece.

35. The invention of claim 34 wherein the surface cutter further comprises a plurality of blades whereby the means for rotating moves the surface cutter causing the blades to finish the outside surface of the curved workpiece.

36. The invention of claim 28 wherein the machining tool comprises a surface finishing tool further comprising a frame having an opening, an assembly comprising the workpiece holders and the workpiece extending through the opening whereby the surface finishing tool finishes the outside surface of the curved workpiece as the means for moving moves the workpiece through the opening in the frame.

37. The invention of claim 36 wherein the surface finishing tool further comprises a circular bearing race on the frame, a surface cutter on the bearing race, a means for rotating on the surface cutter whereby the surface cutter moves concentrically about the opening whereby the outside surface of the curved workpiece is finished as the means for moving causes the curved workpiece to travel through the surface finishing tool opening.

38. The invention of claim 28 further comprising the tangential interface member mounted at an intersection point of the arm and a first tangent to the arcuate shaped workpiece centerline whereby the tangential interface member bears against the curved workpiece along the first tangent.

* * * * *

UNITED STATES PATENT AND TRADEMARK OFFICE
CERTIFICATE OF CORRECTION

PATENT NO. : 5,709,511
DATED : January 20, 1998
INVENTOR(S) : Karim Esmailzadeh

It is certified that error appears in the above-identified patent and that said Letters Patent is hereby corrected as shown below:

Column 1,
Line 14, please delete "an" and insert in its place -- art --.

Column 2,
Lines 1, 4, 5 and 7, please delete "maybe" and insert in its place -- may be --.

Column 7,
Line 2, after the word "group", please delete "of".

Signed and Sealed this

Tenth Day of September, 2002

Attest:

JAMES E. ROGAN
Attesting Officer
Director of the United States Patent and Trademark Office